(12) United States Patent
Hiraide et al.

(10) Patent No.: US 10,502,957 B2
(45) Date of Patent: Dec. 10, 2019

(54) VIRTUAL IMAGE DISPLAY APPARATUS

(71) Applicant: SEIKO EPSON CORPORATION, Tokyo (JP)

(72) Inventors: Noriaki Hiraide, Azumino (JP); Masayuki Takagi, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 1405 days.

(21) Appl. No.: 14/561,631

(22) Filed: Dec. 5, 2014

(65) Prior Publication Data
US 2015/0177520 A1 Jun. 25, 2015

(30) Foreign Application Priority Data

Dec. 25, 2013 (JP) .................................. 2013-266618

(51) Int. Cl.
*G02B 27/01* (2006.01)
*G02B 27/00* (2006.01)

(52) U.S. Cl.
CPC ..... *G02B 27/0172* (2013.01); *G02B 27/0006* (2013.01); *G02B 27/0176* (2013.01); *G02B 2027/0145* (2013.01); *G02B 2027/0178* (2013.01)

(58) Field of Classification Search
CPC ........ G02B 27/0172; G02B 2027/0178; G02B 2027/0145; G02B 27/0006; G02B 27/0176
USPC ................................................ 359/630, 633
See application file for complete search history.

(56) References Cited

U.S. PATENT DOCUMENTS

| | | | | |
|---|---|---|---|---|
| 6,330,121 B1* | 12/2001 | Kobayashi | ............... | G02B 5/04 345/8 |
| 8,570,244 B2* | 10/2013 | Mukawa | ........... | G02B 27/0172 345/8 |
| 8,988,315 B2* | 3/2015 | Mukawa | .................. | G02B 5/32 345/8 |
| 9,046,687 B2* | 6/2015 | Hiraide | .............. | G02B 27/0172 |
| 9,116,342 B2* | 8/2015 | Totani | ................ | G02B 27/0172 |
| 9,207,456 B2* | 12/2015 | Hiraide | .............. | G02B 27/0172 |
| 9,454,011 B2* | 9/2016 | Hiraide | .............. | G02B 27/0176 |
| 9,523,855 B2* | 12/2016 | Hiraide | ................ | G02B 27/017 |
| 9,535,252 B2* | 1/2017 | Hiraide | ............... | G02B 6/0053 |
| 9,726,894 B2* | 8/2017 | Hiraide | ............. | G02B 27/0176 |
| 9,746,674 B2* | 8/2017 | Hiraide | ............. | G02B 27/0172 |
| 9,880,388 B2* | 1/2018 | Hiraide | ............. | G02B 27/0176 |

(Continued)

FOREIGN PATENT DOCUMENTS

| | | |
|---|---|---|
| CN | 102402004 A | 4/2012 |
| JP | A-2013-200553 | 10/2013 |

*Primary Examiner* — Ricky D Shafer
(74) *Attorney, Agent, or Firm* — Oliff PLC

(57) ABSTRACT

In relation to a fourth surface as a partially covered optical surface from among a plurality of optical surfaces which configure a light guiding member in a light guiding device, such as a first surface, an intermediate image is formed at a location separated from the partially covered optical surface (fourth surface). With such a configuration, it is possible to reduce the influence of dirt, contamination, or the like on an image even if the dirt, the contamination, or the like are generated on the partially covered optical surface (fourth surface), from which it is difficult or impossible to remove the dirt, the contamination, or the like, and to display an image with a wide image angle by a configuration forming an intermediate image.

13 Claims, 9 Drawing Sheets

(56) References Cited

U.S. PATENT DOCUMENTS

| | | |
|---|---|---|
| 2009/0168131 A1 | 7/2009 | Yamaguchi et al. |
| 2012/0069448 A1 | 3/2012 | Sugihara et al. |
| 2013/0222896 A1 | 8/2013 | Komatsu et al. |
| 2018/0113318 A1* | 4/2018 | Hiraide ............. G02B 27/0176 |

* cited by examiner

VIRTUAL IMAGE DISPLAY APPARATUS

BACKGROUND

1. Technical Field

The present invention relates to a light guiding device and the like which guides video image light in order to present a video image formed by an image display element and the like to a viewer, and particularly to a virtual image display apparatus which is preferably applied to a head mount display designed to be mounted on the head of the viewer.

2. Related Art

Various optical systems to be embedded in a virtual image display apparatus such as a head mount display (hereinafter, also referred to as an HMD) designed to be mounted on the head of a viewer have been proposed (see JP-A-2013-200553, for example).

For the purpose of downsizing the optical system in such a virtual image display apparatus and separating a video image display apparatus from eye positions of the viewer so as not to interrupt eyesight thereof, it is preferable to use a relay optical system which forms an intermediate image after forming an image once with display image light in the optical system and shows the intermediate image in an enlarged manner.

However, in the case where the intermediate image is formed by using the relay optical system in an optical member such as a prism and there is dirt or contamination on the surface of the optical member near the intermediate image, the dirt or the contamination is viewed by the viewer in an enlarged manner. Therefore, it is desirable that the intermediate image be formed inside the optical member. However, it is difficult to form all the intermediate images inside the optical members in terms of optical design, and there is a possibility that a part of the intermediate images is inevitably formed on the surface of the optical member. In such a case, there is a possibility that dirt, contamination, or the like adheres on the surface of the optical member and causes image degradation.

SUMMARY

An advantage of some aspects of the invention is to provide a virtual image display apparatus capable of forming an image with a wide image angle and satisfactorily maintaining a guiding state of video image light.

An aspect of the invention is directed to a virtual image display apparatus including: a video image element which forms video image light; a light guiding member which has a plurality of optical surfaces, guides video image light from the video image element by reflecting the video image light by an internal surface, and forms an intermediate image; and a coupling member which is arranged between the video image element and the light guiding member, is coupled to the light guiding member, and partially covers the light guiding member, in which the light guiding member includes, in the plurality of optical surfaces, a partially covered optical surface from a first region which is covered with the coupling member to a second region which is not covered with the coupling member, and the intermediate image is formed at a location separated from the partially covered optical surface.

Here, the optical surfaces which configure the light guiding member are surfaces with optical functions and means a surface which reflects light from an inner surface and guides the light, a light incident surface on which the light is made to be incident, and a light emitting surface from which the light is emitted.

According to the virtual image display apparatus, in relation to the partially covered optical surface, which is arranged to face the coupling member coupled to the light guiding member and includes a portion covered with the coupling member and a portion not covered with the coupling member, from among the plurality of optical surfaces which configures the light guiding member, the intermediate image is formed at a location separated from the partially covered optical surface. In such a case, even if a factor of degradation in light guiding for an image is generated or is arranged on the partially covered optical surface which is a location where the light guiding member and the coupling member are brought into contact with each other in a location from which it is difficult or impossible to remove dirt, contamination, or the like, it is still possible to reduce the influence of the dirt, the contamination, or the like in the image formation. That is, the virtual image display apparatus can display an image with a wide image angle by forming the intermediate image and can satisfactorily maintain a guiding state of the video image light by the light guiding member.

In a specific aspect of the invention, in the light guiding member, the intermediate image is formed in a range from a side separating inward from the partially covered optical surface to a side of a surface which faces the partially covered optical surface.

In another aspect of the invention, the virtual image display apparatus further includes a dust proofing structure formed at least between the partially covered optical surface and an end portion of the coupling member between the light guiding member and the coupling member. In such a case, it is possible to prevent an image from being degraded by suppressing dirt or contamination from entering between the partially covered optical surface and the end portion of the coupling member with the dust proofing structure.

In still another aspect of the invention, the dust proofing structure is formed so as to be in contact with an effective light guiding region in the partially covered optical surface and include a sealing member which seals the partially covered optical surface and the coupling member together. In this case, it is possible to prevent adhesion of dirt or contamination to the surface covered with the coupling member in the partially covered optical surface or the inside of the coupling member by attaching the sealing member as the dust proofing structure so as to be in tight contact with the partially covered optical surface, for example. In a case where a lens tube portion which accommodates a projector lens emitting the video image light is present as the coupling member facing the partially covered optical surface, it is possible to tightly close the inside of the lens tube portion by sealing the partially covered optical surface and the lens tube portion with the sealing member together. With such a configuration, the lens tube portion and the sealing member can cooperate to realize dust proofing at the projector lens and the covered portion of the partially covered optical surface. At this time, the partially covered optical surface is arranged separately from a location where the intermediate image is formed, that is, the video image light is not collected on the effective guiding region on the partially covered optical surface. With such a configuration, even if the sealing member is in contact with the effective light guiding region on the partially covered optical surface, it is possible to suppress an increase in influence on the video image light at the contact portion.

In yet another aspect of the invention, the sealing member extends along a boundary between the first region covered with the coupling member and the second region not covered with the coupling member and is in contact with the effective light guiding region on the partially covered optical surface in a light guiding direction, in which the video image light is guided, with a width of equal to or less than 0.5 mm. In such a case, even if components of the video image light are partially absorbed by the sealing member, it is possible to suppress the level of absorption to a level at which the influence of the absorption on the image cannot be visually recognized.

In still yet another aspect of the invention, the dust proofing structure is an elastic member. In such a case, it is possible to reliably seal the partially covered optical surface and the coupling member together without causing a gap therebetween while preventing damage to the optical system.

In further another aspect of the invention, the light guiding member has a surface-textured portion on a surface other than the effective light guiding region. In such a case, it is possible to suppress degradation of the image due to visual recognition of leaking light which is reflected by the surface other than the effective light guiding region in an unintended manner.

In still further another aspect of the invention, the coupling member is a lens tube portion which accommodates a projector lens projecting light from the video image element toward the light guiding member. In such a case, it is possible to prevent adhesion of dirt or contamination to the projector lens or the optical surfaces, which face the projector lens, of the light guiding member.

In yet further another aspect of the invention, the lens tube portion has a fitting structure which is fitted onto the light guiding member. In this case, it is possible to precisely position the lens tube portion and the light guiding member by the fitting, and in the case of the virtual image display apparatus provided with the dust proofing structure, it is possible to realize complete dust proofing or water proofing (drip proofing) between the lens tube portion and the light guiding member by causing the dust proofing structure and the fitting structure to cooperate.

In still yet further another aspect of the invention, the partially covered optical surface is a non-axisymmetric spherical surface. In such a case, it is possible to realize image formation with a small-sized high-performance apparatus.

In a further aspect of the invention, the light guiding member includes four or more surfaces as the plurality of optical surfaces such that a first surface and a third surface from among the plurality of optical surfaces are arranged to face each other, the video image light from the video image element is fully reflected by the third surface, is fully reflected by the first surface, is reflected by the second surface, then transmits through the first surface, and reaches a viewing side, the first surface and the third surface of the light guiding member are substantially parallel planes, and the partially covered optical surface is arranged to face the third surface and corresponds to the fourth surface which fully reflects the video image light from the video image element and guides the reflected video image light to the third surface. In this case, it is possible to substantially eliminate a diopter scale error used for the external light which is viewed after transmitting to the first surface and the third surface, and particularly, it is possible to substantially eliminate a magnification error in appearance of an external image and to obtain a state which is close to that of the naked eye.

In a sill further aspect of the invention, the intermediate image is formed on a side which is closer to the third surface than to the fourth surface in the light guiding member. In this case, the arrangement of the third surface at the position at which the third surface faces the fourth surface as the partially covered optical surface enables arrangement of the third surface at a position from which dirt or contamination can be easily removed, for example, and it is possible to maintain the intermediate image and a vicinity thereof in a state free of dirt and contamination.

In a yet further aspect of the invention, the virtual image display apparatus further includes: alight transmitting member which is attached to the light guiding member such that external light and the video image light are visually recognized in an overlapped manner. In this case, it is possible to configure a see-through-type optical system which overlaps the video image light and the external light.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a detailed description will be given of an embodiment of a light guiding device and a virtual image display apparatus, which includes the light guiding device, according to the invention with reference to FIG. 1.

Figure 1:
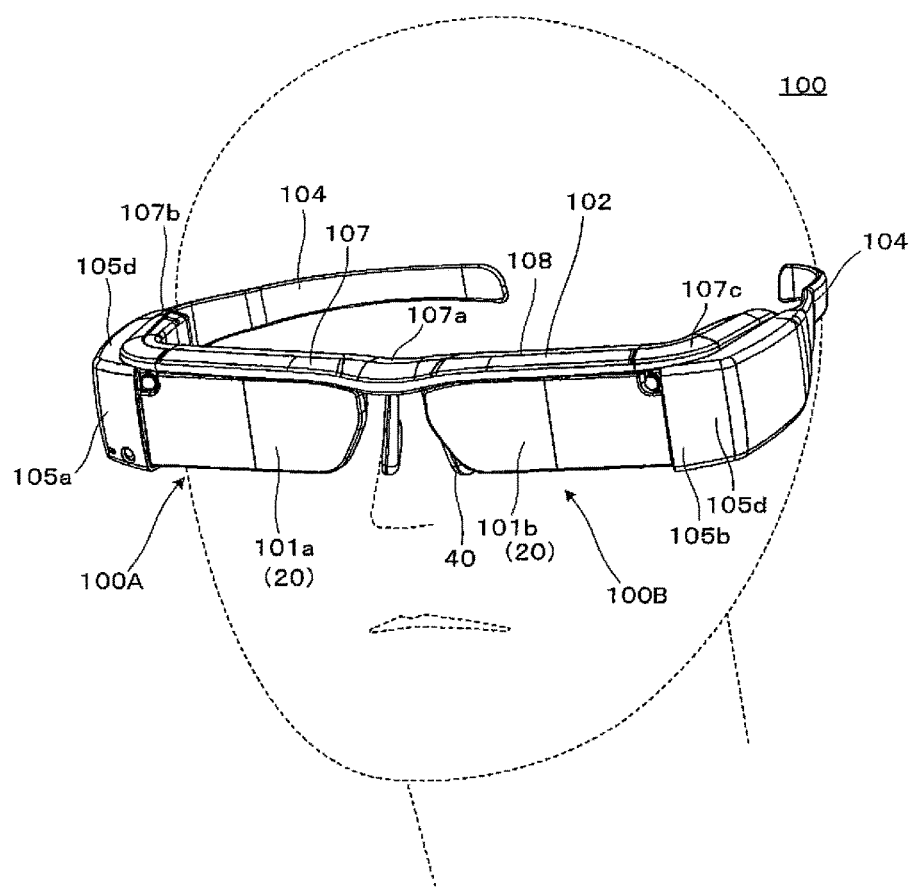
FIG. 1 is a perspective view simply illustrating an appearance of a virtual image display apparatus according to an embodiment of the invention.

As shown in FIG. 1, a virtual image display apparatus 100, which includes a light guiding device, according to the embodiment is a head mount display with an appearance similar to glasses, can cause a viewer or a user who wears the virtual image display apparatus 100 to visually recognize image light (video image light) by a virtual image, and can cause the viewer to visually recognize or view an external image in a see-through manner. The virtual image display apparatus 100 is provided with first and second optical members 101*a* and 101*b* which cover the front of eyes of the viewer while providing visualization, a frame portion 102 which supports both the optical members 101a and 101b, and first and second image formation main body portions 105a and 105b which are added to portions from both ends of the frame portion 102 in the left-right direction to temples 104 on the rear side. Here, a first display device 100A as a combination of the first optical member 101a and the first image formation main body portion 105a on the left side in the drawing is a portion where a virtual image for the right eye is formed, and the first display device 100A also functions alone as a virtual image display apparatus. In addition, a second display device 100B as a combination of the second optical member 101b and the second image formation main body portion 105b on the right side in the drawing is a portion where a virtual image for the left eye is formed, and the second display device 100B also functions alone as a virtual image display apparatus.

Figure 2:
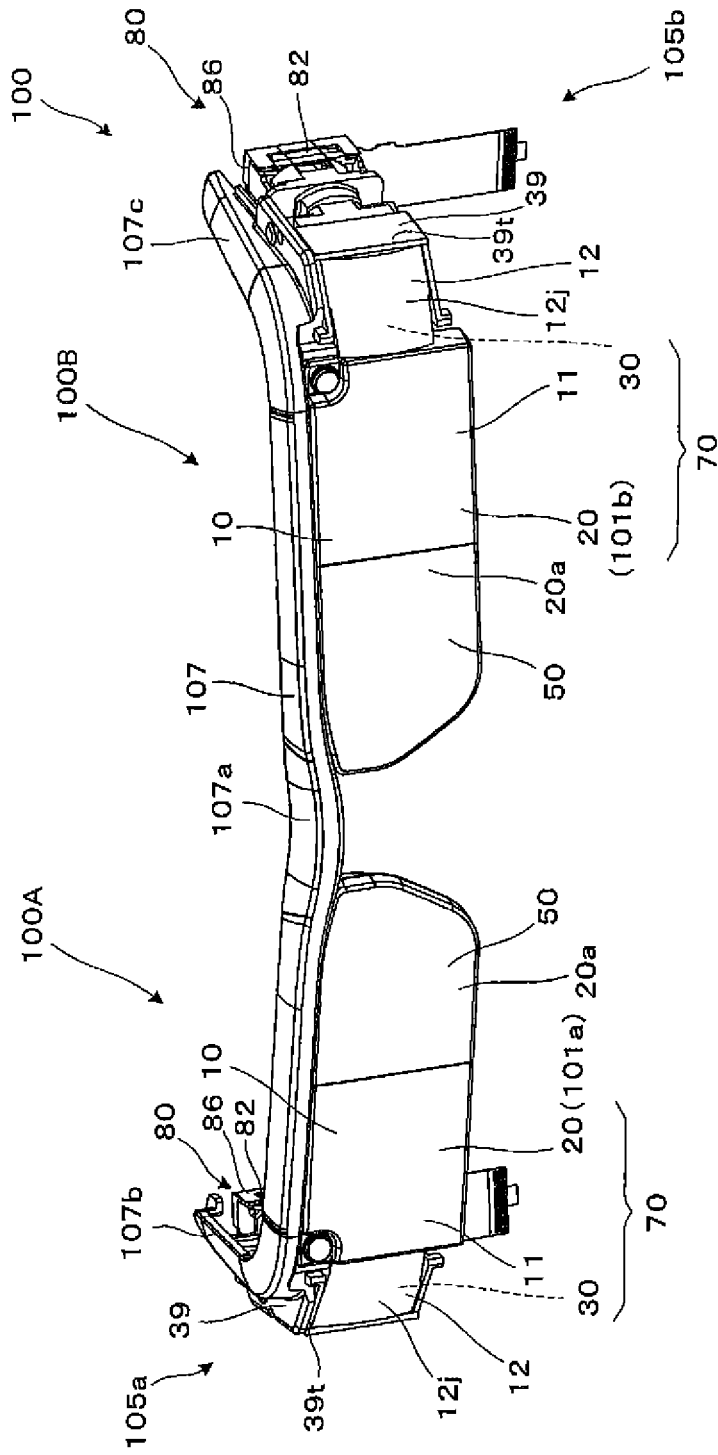
FIG. 2 is a perspective view showing an internal structure of the virtual image display apparatus from which external accessory members are removed.
Figure 3A:
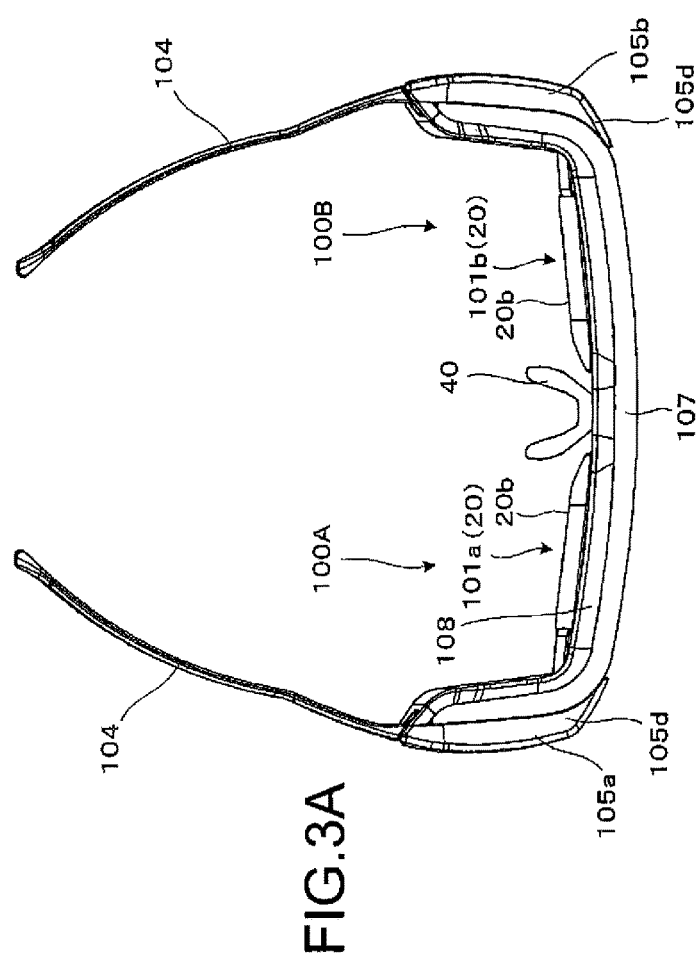
FIG. 3A is a planar view showing the appearance of the virtual image display apparatus.
Figure 3C:
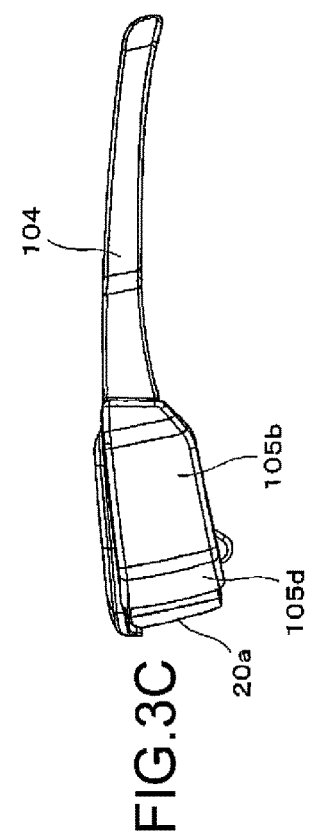
FIG. 3C is a side view thereof.
Figure 3B:
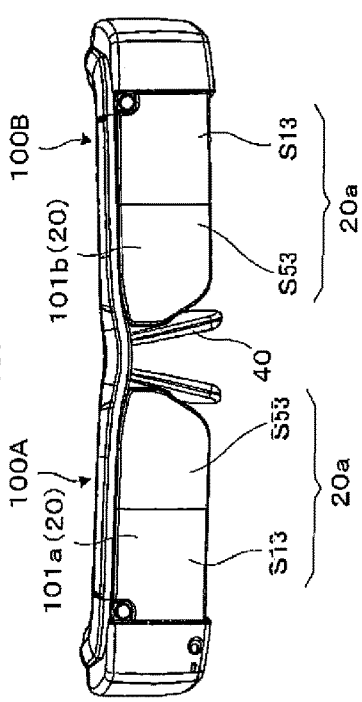
FIG. 3B is a front view thereof.

FIG. 2 shows an internal structure of the virtual image display apparatus 100, and the appearance and the inside of the virtual image display apparatus 100 can be compared by comparison of FIG. 2 with FIG. 1. For example, each of the first and second image formation main body portions 105a and 105b is configured of an image display device 80 which includes a projector lens 30 accommodated in a lens tube portion 39 and a video image display element (video image element) 82.

As shown in the respective drawings from FIG. 1 to FIG. 4 of the appearance and the inside thereof, the frame portion 102 provided in the virtual image display apparatus 100 is provided with a frame 107 arranged on an upper end side and a resin portion 108 which is arranged along the frame 107 on the rear side thereof. In addition, the virtual image display apparatus 100 has a configuration in which a frame-shaped portion is not provided on the lower side. The frame 107 which configures the frame portion 102 is a thin and long plate-shaped member which is curved in a U shape and is provided with a front portion 107a which extends in the left-right traverse direction as a direction corresponding to alignment of the eyes of the viewer and a pair of side portions 107b and 107c which extend in a depth direction as a direction corresponding to the front and the back of the viewer. The frame 107, namely the front portion 107a and the side portions 107b and 107c are a metal integrated component which is formed of a metal material such as die cast aluminum. The resin portion 108 is arranged along the frame 107 and cooperates with the frame 107 by being fitted to the frame 107 so as to be able to accommodate various cables and the like for image formation, for example. In the frame 107, the width of the front portion 107a and the resin portion 108 in the depth direction is substantially the same as the thickness or the width of the light guiding device 20 corresponding to the first and second optical members 101a and 101b. On the left side of the frame 107, specifically, at a portion from the left end portion of the front portion 107a when viewed from a front direction of the virtual image display device to the side portion 107b, the first optical member 101a and the first image formation main body portion 105a are aligned and supported by being directly fixed by screwing, for example. On the right side of the frame 107, specifically, at a portion from the right end portion of the front portion 107a when viewed from a front direction of the virtual image display device to the side portion 107c, the second optical member 101b and the second image formation main body portion 105b are aligned and supported by being directly fixed by screwing, for example. In addition, the first optical member 101a and the first image formation main body portion 105a are aligned so as to be fit to each other, and the second optical member 101b and the second image formation main body portion 105b are aligned so as to be fit to each other.

The frame 107 and the resin portion 108 which configure the frame portion 102 support the first and second image formation main, body portions 105a and 105b and also play a role in protecting the insides of the first and second image formation main body portions 105a and 105b by cooperation with a cover-shaped external accessory member 105d which covers the first and second image formation main body portions 105a and 105b. In addition, the frame 107 is separated from or in loose contact with an upper portion except for a root side of the first and second optical members 101a and 101b or the light guiding devices 20, which are coupled to the first and second image formation main body portions 105a and 105b. For this reason, even if there is a difference in thermal coefficients between the light guiding devices 20 at the center and the frame portion 102 including the frame 107, expansion of the light guiding devices 20 in the frame portion 102 is allowed, and it is possible to prevent strain, deformation, and breakage from occurring in the light guiding device 20.

A nose receiving portion 40 is additionally provided in the frame portion 102. The nose receiving portion 40 plays a role in supporting the frame portion 102 by abutting on the nose of the viewer. That is, the frame portion 102 is arranged in front of the face of the viewer by the nose receiving portion 40 supported at the nose and the pair of temples 104 supported at the ears. The nose receiving portion 40 is fixed by screwing at the front portion 107a of the frame 107 which configures the frame portion 102. In addition, the appearance shown with reference to FIG. 1 is an example, and designs for portions which are not directly involved in the optical mechanism, such as a mechanism for fixing screws, can be appropriately changed.

As shown in FIG. 2 and the like, it is possible to understand that the first display device 100A is provided with a perspective projection device 70 as an optical system for projection and an image display device 80 which forms video image light. The perspective projection device 70 plays a role in projecting an image formed by the image display device 80 as a virtual image to the eyes of the viewer. The perspective projection device 70 is provided with a first optical member 101a or the light guiding device 20 and the projector lens 30 for image formation. The first optical member 101a or the light guiding device 20 are configured of a light guiding member 10 for light guiding and visualization and a light transmitting member 50 for visualization. In addition, the first image formation main body portion 105a is configured of the image display device 80 and the projector lens 30. The projector lens 30 which is configured of a group of lenses is accommodated in the lens tube portion 39 and is fixed at an end portion 39t of the lens tube portion 39 in a state of being precisely positioned by fitting with respect to the light guiding device 20 as will be described in detail later.

The image display device 80 includes a video image display element (video image element) 82 as a transmissive space light modulation device, an illumination device (not shown) as a backlight which emits illumination light to the video image display element 82, and a drive control unit (not shown) which controls operations of the video image display element 82 and the like as will be described in detail later. The video image display element 82 is accommodated in a video image element case 86 and assembled with the lens tube portion 39, which accommodates the projector lens 30 for image formation, in the video image element case 86. In other words, the lens tube portion 39 is a coupling member which is arranged between the video image display element 82 and the light guiding device 20, and the lens tube portion 39 is a coupling member which is coupled to the light guiding device 20 and couples between the light guiding device 20 and the projector lens 30 while partially covering the light guiding member 10 in the light guiding device 20.

The light guiding device 20 is configured of the light guiding member 10 for light guiding and visualization and the light transmitting member 50 for visualization as described above. The light guiding member 10 is a part of the prism-type light guiding device 20 and an integrated member, and can be separately understood as a first light guiding portion 11 on the light emitting side and a second light guiding portion 12 on the light incident side. The light transmitting member 50 is a member (assistant optical block) which assists the visualization function of the light guiding member 10 and forms a light guiding device 20 by being integrally fixed to the light guiding member 10. By fitting a tip end portion 12$j$ of the light guiding device 20 with the aforementioned configuration, which is positioned on the light source side (root side) to the end portion 39$t$ of the lens tube portion 39, the light guiding device 20 is precisely positioned with respect to the projector lens 30 and is fixed thereto.

Figure 4:
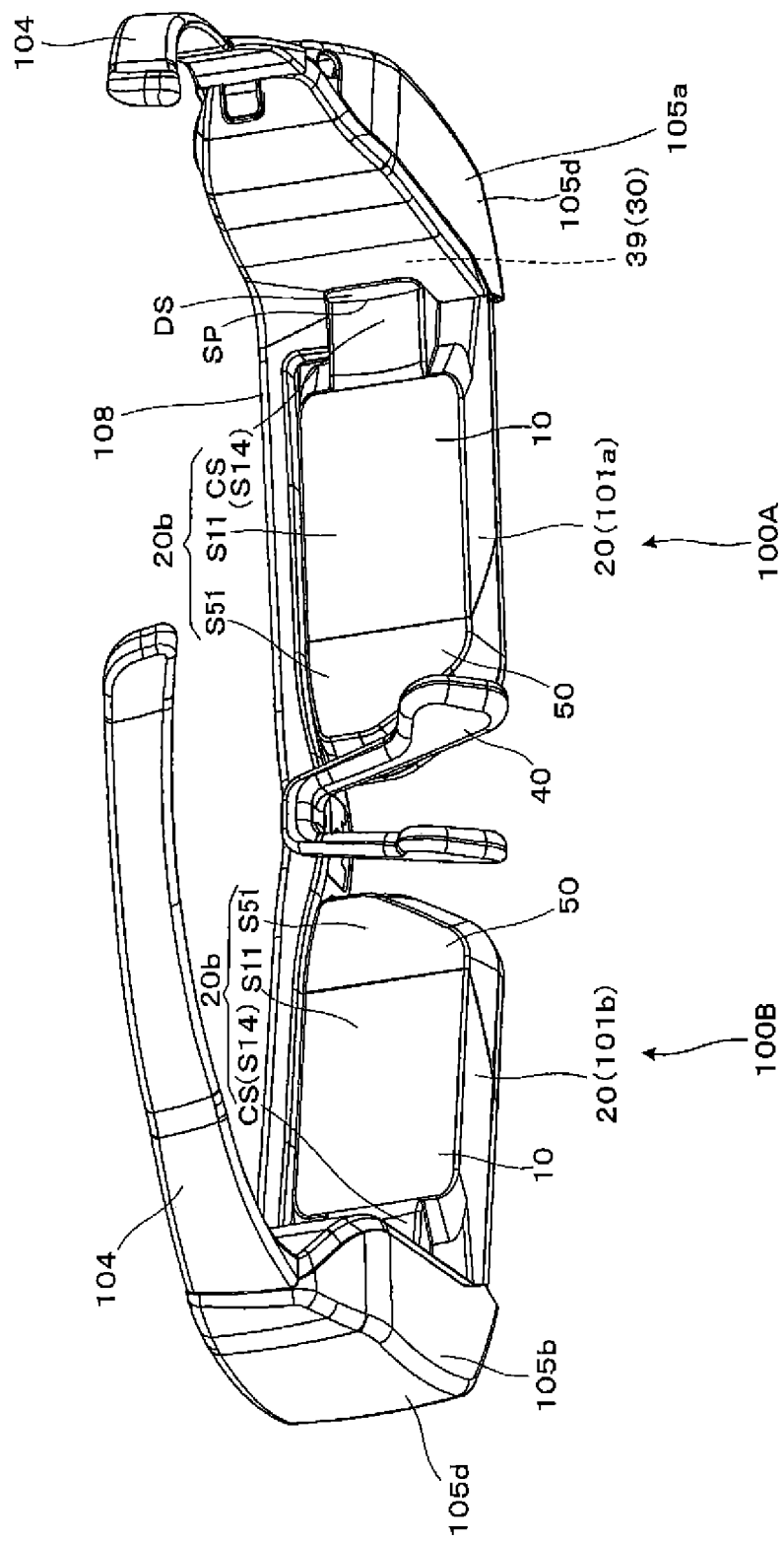
FIG. 4 is a perspective view of the appearance of the virtual image display apparatus shown from another angle.

Here, a first exposed surface 20$a$ as a front (outside) exposed surface and a second exposed surface 20$b$ as a rear (inside) exposed surface among the optical surfaces which configure the light guiding device 20 are portions which are exposed to the outside and have an influence on the see-through function as shown in FIGS. 3A to 3C and 4, for example. For this reason, it is desirable that dirt, dust, and contamination due to sebum, and the like do not adhere to these exposed surfaces 20$a$ and 20$b$ or that the adhesions, if any, can be easily wiped off. In addition, the first exposed surface 20$a$ is configured of a third surface S13 from among the optical surfaces of the light guiding member 10 and a third transmitting surface S53 as an optical surface of the light transmitting member 50, and the second exposed surface 20$b$ is configured of a first surface S11 and a fourth surface S14 from among the optical surfaces of the light guiding member 10 and a first transmitting surface S51 from among the optical surfaces of the light transmitting member 50 as shown in the drawings. For example, flat portions and the like of the first exposed surface 20$a$ and the second exposed surface 20$b$ on the side close to the nose receiving portion 40 are considered to be portions which can be relatively easily wiped. In contrast, a portion of the second exposed surface 20$b$, which is close to the lens tube portion 39 as the coupling member, is considered to be a portion where a problem easily occurs in wiping off dirt, dust, and the like. Specifically, it is more difficult to wipe the partially covered optical surface CS, which is arranged from a region covered with the external accessory member 105$d$ for accommodating the lens tube portion 39 (see FIG. 2) as well as the projector lens 30 and the like to an uncovered region, from among the optical surfaces which configure the second exposed surface 20$b$ than the first exposed surface 20$a$ as shown in FIG. 4, and it is significantly important to handle such a surface and a periphery thereof delicately. In the example shown in the drawing, the fourth surface S14 in the second exposed surface 20$b$ corresponds to the partially covered optical surface CS. Furthermore, according to the embodiment, a dust proofing structure DS is provided between the light guiding member 10 of the light guiding device 20 and the lens tube portion 39 which covers the projector lens 30. Although a specific description will be given later, the dust proofing structure DS includes a sealing member SP which is in contact with the effective light guiding region in the partially covered optical surface CS (fourth surface S14) to seal the partially covered optical surface CS and the lens tube portion 39 together, that is, the inside of the lens tube portion 39 is tightly closed in the embodiment. With such a configuration, the problem of dirt, dust, and the like in the periphery of the partially covered optical surface CS is alleviated. Specifically, although the problem occurs if dirt, dust, or the like enters the inside of the lens tube portion 39 at a portion such as the periphery of the partially covered optical surface CS, the problem can be prevented with the sealing member SP. According to the embodiment, a configuration in which the partially covered optical surface CS is separated from the position of the intermediate image with the video image light (a configuration of being separated from the position of the intermediate image) is employed as will be described later. With such a configuration, it is possible to reduce the influence of dirt, dust, or the like on the partially covered optical surface CS as the optical surface or the contact with the seaming member SP on the guiding of the video image light. As described above, the virtual image display apparatus 100 can form an image with a wide image angle and satisfactorily maintain the guiding state of the video image light.

Figure 5:
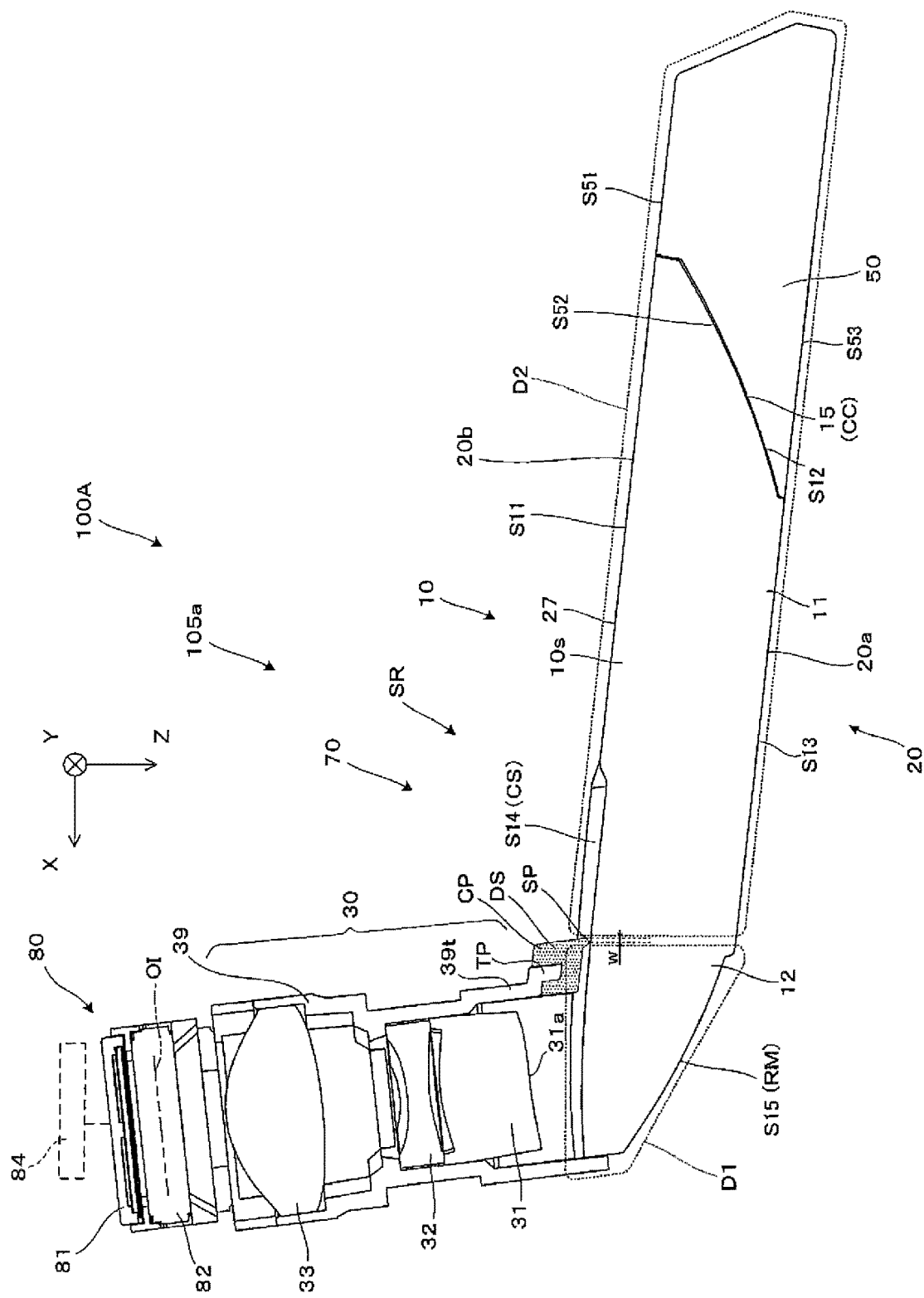
FIG. 5 is a cross-sectional view of a main body portion, which configures the virtual image display apparatus, in plan view.

Hereinafter, a detailed description will be given of an optical configuration of the virtual image display apparatus 100 which includes the sealing member SP, namely the dust proofing structure DS with reference to FIG. 5. As an assumption thereof, a detailed description will be given of the image display device 80 and the projector lens 30 which configure the first image formation main body portion 105$a$ (see FIG. 1).

The image display device 80 includes an illumination device 81 which emits illumination light to the video image display element 82 and a drive control unit 84 which controls operations of the illumination device 81 and the video image display element 82 in addition to the aforementioned video image display element 82.

The illumination device 81 of the image display device 80 includes a light source which generates light including three colors, namely red, green, and blue and a backlight guiding portion which disperses the light from the light source and forms a light flux with a rectangular cross section. The video image display element (video image element) 82 is formed of a liquid crystal display device, for example, is configured of a plurality of pixels, and forms image light as a display target, such as a moving image, by spatially modulating the illumination light from the illumination device 81. The drive control unit 84 is configured of a light source drive circuit which supplies power to the illumination device 81 and causes the illumination device 81 to emit illumination light with stable luminance and a liquid crystal drive circuit which forms color video image light or image light as a transmittance pattern which functions as a source of a moving image or a stationary image by outputting an image signal or a drive signal to the video image display element (video image element) 82 although not shown in the drawing. In addition, it is possible to provide an image processing function to the liquid crystal drive circuit, or alternatively, it is also possible to provide the image processing function to an external control circuit.

The projector lens 30 is a projection optical system which includes, as constituent elements, three optical elements (lenses) 31 to 33 along an optical axis on the incident light side, and is supported by the lens tube portion 39 accommodating these optical elements 31 to 33. Each of the optical elements 31 to 33 is an aspherical lens including both a non-axisymmetric aspherical surface and an axisymmetric aspherical surface, and cooperates with a part of the light guiding member 10 to form an intermediate image, which corresponds to a display image of the video image display element 82, inside the light guiding member 10. In the respective lenses (optical elements) 31 to 33, a lens surface 31a as a light emitting surface of the first lens 31 is a non-axisymmetric aspherical surface, and lens surfaces other than the lens surface 31a are axisymmetric aspherical surfaces.

Hereinafter, a detailed description will be given of the light guiding device 20 and the like. As described above, the light guiding device 20 is configured of the light guiding member 10 and the light transmitting member 50. Among the light guiding member 10 and the light transmitting member 50, the light guiding member 10 has a portion, which linearly extends, on the center side (in front of the eyes) close to the nose in a plan view. The first light guiding portion 11, which is arranged on the center side close to the nose, namely on the light emitting side, in the light guiding member 10 includes, as side surfaces with optical functions, a first surface S11, a second surface S12, and a third surface S13. The second light guiding portion 12 which is arranged on a peripheral side separated from the nose, namely on the light incident side includes, as side surfaces with optical functions, a fourth surface S14 and a fifth surface S15. Among the side surfaces, the first surface 311 and the fourth surface S14 are continuously adjacent to each other, and the third surface S13 and the fifth surface S15 are continuously adjacent to each other. In addition, the second surface S12 is arranged between the first surface 311 and the third surface S13, and the fourth surface S14 and the fifth surface S15 are adjacent to each other at a large angle. Furthermore, the first surface S11 and the third surface S13 which are arranged so as to face each other have substantially parallel planar shapes here. In contrast, the other surfaces with the optical functions, namely the second surface S12, the fourth surface S14, and the fifth surface S15 are non-axisymmetric spherical surfaces (free spherical surfaces). As described above, the third surface S13 configures the first exposed surface 20a, and the first surface S11 and the fourth surface S14 configure the second exposed surfaces 20b.

In addition, the light guiding member 10 is joined to the light transmitting member 50 via an adhesive layer CC, and a portion configured of the joining surface between the light guiding member 10 and the light transmitting member 50 and the adhesive layer CC will be referred to as a joining portion CN in the light guiding device 20. In addition, the light guiding device 20 is formed by joining a base material of the light guiding member 10 and the light transmitting member 50 at the joining portion CN and then coating the joined base material by dip processing. That is, a hard coating layer 27 of the light guiding member 10 is provided on the light transmitting member 50 and the entire light guiding device 20.

Here, according to the embodiment, the fourth surface S14 as one of the optical surfaces which configure the light guiding member 10 of the light guiding device 20 corresponds to the partially covered optical surface CS as described above. Specifically, the fourth surface S14 is arranged as the partially covered optical surface CS in the range from the first region D1 covered with the end portion 39t (see FIG. 2) of the lens tube portion 39 as the coupling member and the second region D2 which is not covered with the end portion 39t. Furthermore, according to the embodiment, the dust proofing structure DS including the sealing member SP which extends along the boundary between the first region D1 and the second region D2 in the partially covered optical surface CS (fourth surface S14) is provided.

In addition, the surfaces S14 and S15 other than the first surface S11 to the third surface S13 from among the plurality of surfaces which configure the light guiding member 10 include at least one point with different curvature symbols depending on directions in at least one free spherical surface. With such a configuration, it is possible to precisely control the guiding of the video image light and to reduce the size of the light guiding member 10.

A main body 10s of the light guiding member 10 is formed of a resin material which has a high light transmitting property in a visible region and is molded by injecting and solidifying thermoplastic resin in a mold, for example. As a material of the main body 10s, it is possible to use cycloolefin polymer, for example. Although the main body 10s is formed as an integrally formed article, the light guiding member 10 can be considered therefore by being functionally divided into the first light guiding portion 11 and the second light guiding portion 12 as described above. The first light guiding portion 11 enables wave guiding and emission of video image light GL and enables visualization of external light HL. The second light guiding portion 12 enables incidence and wave guiding of the video image light GL.

In the first light guiding portion 11, the first surface S11 functions as a refractive surface which emits the video image light GL to the outside of the first light guiding portion 11 and also functions as a full reflective surface which fully reflects the video image light GL on the inner surface side. The first surface S11 is arranged in front of the eyes EY and has a planar shape as described above. In addition, the first surface S11 is a surface formed of the hard coating layer 27 provided on the surface of the main body 10s.

The second surface S12 is a surface of the main body 10s and includes a half mirror layer 15 additionally provided thereon. The half mirror layer 15 is a reflective film with a light transmitting property (that is, a semi-transmitting reflective film). The half mirror layer (semi-transmitting reflective film) 15 is formed on a partial region (omitted in the drawing), which is obtained by narrowing the second surface S12 in the vertical direction along the Y axis, instead of the entirety of the second surface S12. The half mirror layer 15 is formed by forming a metal reflective film or a dielectric body multilayered film on the partial region PA on a base coating surface of the main body 10s. A reflection rate of the half mirror layer 15 with respect to the video image light GL is equal to or greater than 10% and equal to or less than 50% in a range of the assumed incident angle of the video image light GL in terms of facilitating viewing of the external light HL by the see-through function. A reflection rate of the half mirror layer 15 according to a specific embodiment with respect to the video image light GL is set to 20%, for example, and transmittance thereof with respect to the video image light GL is set to 80%, for example.

The third surface S13 functions as a fully reflective surface which fully reflects the video image light GL on the inner surface side. The third surface S13 is arranged substantially in front of the eyes EY, has a planar shape in the same manner as the first surface S11, has a diopeter scale of 0 when the external light HL is viewed by causing the external light HL to pass through the first surface S11 and the third surface S13, by the configuration in which the first surface S11 and the third surface S13 are mutually parallel surfaces, and does not particularly cause any variable power.

In addition, the third surface S13 is a surface formed by the hard coating layer 27 which is provided on the surface of the main body 10s.

In the second light guiding portion 12, the fourth surface S14 functions as a fully reflective surface which fully reflects the video image light GL on the inner surface side. The fourth surface S14 also functions as a refractive surface which causes the video image light GL to be incident on the inside of the second light guiding portion 12. That is, the fourth surface S14 functions both as a light incident surface which causes the video image light GL to be incident on the light guiding member 10 from the outside and as a reflective surface which delivers the video image light GL to the inside of the light guiding member 10. In addition, the fourth surface S14 is a surface which is formed by the hard coating layer 27 which is provided on the surface of the main body 10s.

In the second light guiding portion 12, the fifth surface S15 is formed by forming a light reflective film RM formed of an inorganic material on the surface of the main body 10s and functions as a reflective surface.

According to the embodiment, the video image light from the video image display element 82 is guided by the reflective caused five times from the first surface S11 to the fifth surface S15, which includes the full reflection caused at least twice, inside the light guiding member 10 as described above. With such a configuration, it is possible to realize both the display of the video image light GL and the see-through for causing the viewer to visually recognize the external light HL, and to correct aberrations of the video image light GL.

The light transmitting member 50 forms one light guiding device 20 which is integrally fixed to the light guiding member 10 as described above and is a member (assistant optical block) which assists the visualization function of the light guiding member 10. The light transmitting member 50 includes the first transmitting surface S51, the second transmitting surface S52, and the third transmitting surface S53 as side surfaces with optical functions. Here, the second transmitting surface S52 is arranged between the first transmitting surface S51 and the third transmitting surface S53. The first transmitting surface S51 is on a plane obtained by extending the first surface S11 of the light guiding member 10, the second transmitting surface S52 is a spherical surface which is joined to and integrated with the second surface S12 with the adhesive layer CC, and the third transmitting surface S53 is on a plane obtained by extending the third surface S13 of the light guiding member 10. Among the surfaces, the second transmitting surface S52 and the second surface S12 of the light guiding member 10 are integrated by being joined via the thin adhesive layer CC and thus have shapes with substantially the same curvature.

The light transmitting member (assistant optical block) 50 has a high light transmitting property in the visible region, and a main body portion of the light transmitting member is formed of a thermoplastic resin material with substantially the same refractive index as that of the main body 10s of the light guiding member 10. In addition, the light transmitting member 50 is formed by joining the main body portion thereof to the main body 10s of the light guiding member 10 and forming a film by hard coating along with the main body 10s in the joined state. That is, the light transmitting member 50 has the main body portion with the surface on which the hard coating layer 27 is provided in the same manner as the light guiding member 10. The first transmitting surface S51 and the third transmitting surface S53 are surfaces which are formed by the hard coating layer 27 formed on the surface of the main body portion.

The dust proofing structure DS is provided between the light guiding device 20 configured of the light guiding member 10 and the light transmitting member 50 as described above and the lens tube portion 39 which accommodates the projector lens and functions as the coupling member. The dust proofing structure DS is an elastic member, such as elastomer, formed of a material made of resin. The dust proofing structure DS includes the sealing member SP as an optical surface contact portion which is in contact with the effective light guiding region in the partially covered optical surface CS as the fourth surface S14 of the light guiding device 20 and an attachment groove portion CP with a concave shape corresponding to a convex portion TP which configures the tip end of the end portion 39t of the lens tube portion 39. With such a configuration, the dust proofing structure DS enables dust proofing or water proofing (drip proofing) between the end portion 39t of the lens tube portion 39 and the partially covered optical surface CS (fourth surface S14) of the light guiding member 10. In addition, dust proofing at a portion other than the portion as the target of the dust proofing by the dust proofing structure DS is achieved by providing a fitting structure for fitting the lens tube portion 39 to the light guiding device 20 as will be described later.

In the dust proofing structure DS, the sealing member SP extends along the boundary between the first region D1 and the second region D2 (see FIG. 4), and a value of a width w in a light guiding direction (X direction) in which the video image light is guided is equal to or less than 0.5 mm.

Here, it is generally considered to be unpreferable to bring an object into contact with a main surface which is optically effective, such as the fourth surface S14 (partially covered optical surface CS). In contrast, the embodiment is configured such that the intermediate image of the video image light is formed at a location separated from the optically effective surface, namely the partially covered optical surface CS (fourth surface S14) from among the optical surfaces. In other words, an unfocused blurred image is formed on the partially covered optical surface CS. By suppressing the width w in the light guide direction, in which the video image light is guided, to be equal to or less than 0.5 mm as described above in this state, it is possible to reduce the influence of the occurrence of a factor of degradation in guiding the light for the image, if any, on the image formation and to satisfactorily maintain the guiding state of the video image light in the light guiding member.

In addition, since the sealing member SP which configures the dust proofing structure DS is the variable elastic member, it is possible to maintain reliable sealing even in a case where the fourth surface S14 (partially covered optical surface CS) is a non-axisymmetric spherical surface, namely a free spherical surface.

Figure 6:
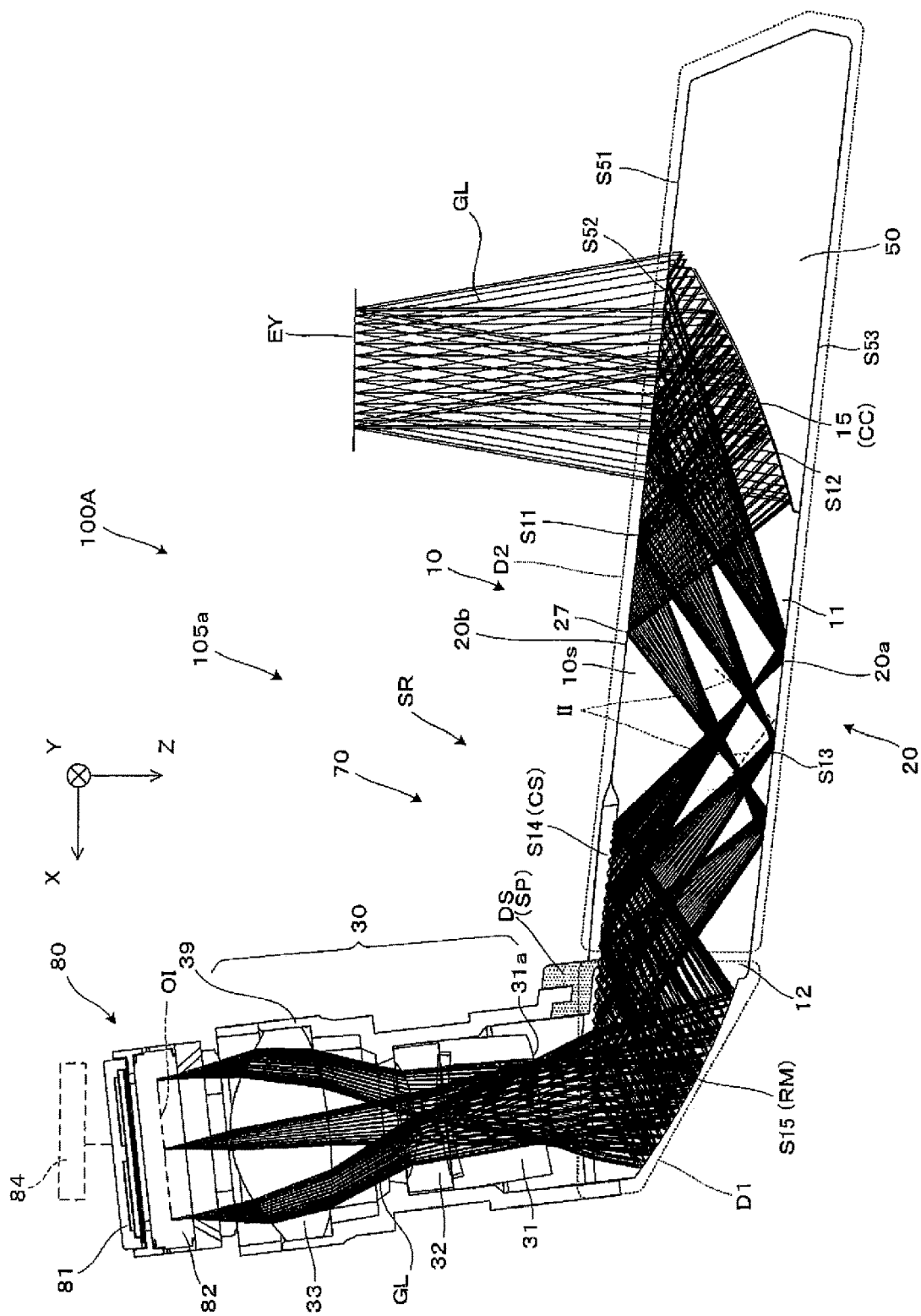
FIG. 6 is a diagram showing an optical path of video image light in the virtual image display apparatus.

Hereinafter, a specific description will be given of an optical path of the video image light GL and the like in the virtual image display apparatus 100 with reference to FIG. 6. The video image light GL emitted from the video image display element (video image element) 82 is converged by being made to pass through the respective lenses 31 to 33 which configure the projector lens 30, a prescribed astigmatism is applied thereto, and the video image light GL is then incident on the fourth surface S14 with a positive refractive power which is provided to the light guiding member 10. In addition, the astigmatism is offset while the video image light GL passes through the respective surfaces of the light guiding member 10, and the video image light is finally emitted in the initial state toward the eyes of the viewer.

The video image light GL after being incident on and passing through the fourth surface S14 of the light guiding member 10 advances while being converged, is reflected by the fifth surface S15 with a relatively weak positive refractive power when passing through the second light guiding portion 12, is incident again on the fourth surface S14 from the inside, and is reflected by the fourth surface S14.

The video image light GL reflected by the fourth surface S14 of the second light guiding portion 12 is incident on and fully reflected by the third surface S13, which has substantially no refractive power, at the first light guiding portion 11, and is incident on and fully reflected by the first surface S11 which has substantially no refractive power.

Here, the video image light GL forms an intermediate image in the light guiding member 10 before or after passing through the third surface S13. An image plane II of the intermediate image corresponds to an image plane OI of the video image display element 82. In addition, the image plane II of the intermediate image shown in the drawing is formed in the optical path of the video image light from the third surface S13 to the fourth surface S14 on a side closer to the third surface S13 than to the fourth surface S14 (partially covered optical surface CS), that is, the image plane II is formed in a range from a side separated inward from the fourth surface S14 (partially covered optical surface CS) to a side of the third surface S13 as a surface which faces the fourth surface S14, and the image plane II of the intermediate image is distant from the fourth surface S14 (partially covered optical surface CS). With such a configuration, it is possible to sufficiently suppress the influence of the video image light even if the sealing member SP in the dust proofing structure DS is in contact with the fourth surface S14 (partially covered optical surface CS) over the width w (see FIG. 5) in the light guiding direction (x direction) in which the video image light is guided. That is, even if the components of the video image light are slightly absorbed by the sealing member SP, it is possible to suppress the level of absorption to a level in which the viewer does not feel that the visually recognized image becomes dark due to the absorption. In other words, the image plane II of the intermediate image is formed separated on the further inner side of the light guiding device 20 than the portion included in the second region D2 in the partially covered optical surface CS, and the distance from the image plane II of the intermediate image to the partially covered optical surface CS is maintained so as not to cause degradation in guiding the video image light GL. In such a case, it is possible to arrange the third surface S13 which configures the first exposed surface 20a at a position from which it is possible to relatively easily remove dirt or contamination (a position which can be easily wiped) and to maintain a state where there is no dirt and contamination in the intermediate image and the periphery thereof.

Returning to FIG. 6, the video image light GL which is fully reflected by the first surface S11 is incident on the second surface S12. However, the video image light GL which is incident on the half mirror layer 15, in particular, partially transmits through the half mirror layer 15, is partially reflected by the half mirror layer 15, and is incident on and transmits through the first surface S11 again. In addition, the half mirror layer 15 acts on the video image light GL reflected by the half mirror layer 15 as a half mirror layer with a relatively strong positive refractive power. In addition, the first surface S11 acts on the video image light GL which passes through the first surface S11 as a surface with no refractive power.

The video image light GL which passes through the first surface S11 is incident on the eyes EY of the viewer or on an equivalent position thereof as substantially parallel light flux. That is, the viewer views an image formed on the video image display element (video image element) 82 by the video image light GL as a virtual image.

In contrast, a part of the external light HL, which is incident on the further +X side than the second surface S12 of the light guiding member 10 passes through the third surface S13 and the first surface S11 of the first light guiding portion 11. However, substantially no aberration in the light occurs at this time since the third surface S13 and the first surface S11 are substantially parallel planes. That is, the viewer views an external image through the light guiding member 10 with no strain. Similarly, a part of the external light HL, which is incident on the further −X side than the second surface S12 of the light guiding member 10, that is, a part which is incident on the light transmitting member 50 does not cause aberration when passing through the third transmitting surface S53 and the first transmitting surface S51 since the third transmitting surface S53 and the first transmitting surface S51 are substantially parallel planes. That is, the viewer views the external image through the light transmitting member 50 with no strain. Furthermore, a part of the external light HL, which is incident on the light transmitting member 50 corresponding to the second surface S12 of the light guiding member 10, causes substantially no aberration and the like when passing through the third transmitting surface S53 and the first surface S11 since the third transmitting surface S53 and the first surface S11 are substantially parallel planes. In addition, both the second surface S12 of the light guiding member 10 and the second transmitting surface S52 of the light transmitting member 50 have substantially the same spherical shapes and have substantially the same refractive index, and a gap therebetween is filled with the adhesive layer CC with substantially the same refractive index. That is, the second surface S12 of the light guiding member 10 and the second transmitting surface S52 of the light transmitting member 50 do not act as refractive surfaces of the external light HL.

However, the external light HL which is incident on the half mirror layer 15 partially transmits through the half mirror layer 15 and is partially reflected by the half mirror layer 15. Therefore, the external light HL from a direction corresponding to the half mirror layer 15 is weakened at the transmittance of the half mirror layer 15. In contrast, since the video image light GL is incident from the direction corresponding to the half mirror layer 15, the viewer views both the image formed on the video image display element (video image element) 82 and the external image in the direction of the half mirror layer 15.

A part, which is not reflected by the half mirror layer 15, of the video image light GL which is delivered to the light guiding member 10 and is incident on the second surface S12 is incident on the light transmitting member 50. However, the part the video image light GL is prevented from returning to the light guiding member 10 by a reflection preventing portion which is provided in the light transmitting member 50 and is not shown in the drawing. That is, the video image light GL which transmits through the second surface S12 is prevented from returning to the optical path and becoming stray light. In addition, the external light HL which is incident from the side of the light transmitting member 50 and is reflected by the half mirror layer 15 is returned to the light transmitting member 50. However, the external light HL is prevented from being emitted to the light guiding member 10 by the aforementioned reflection preventing portion which is provided in the light transmitting member 50 and is not shown in the drawing. That is, the external light HL reflected by the half mirror layer 15 is prevented from returning to the optical path and becoming stray light.

Figure 7:
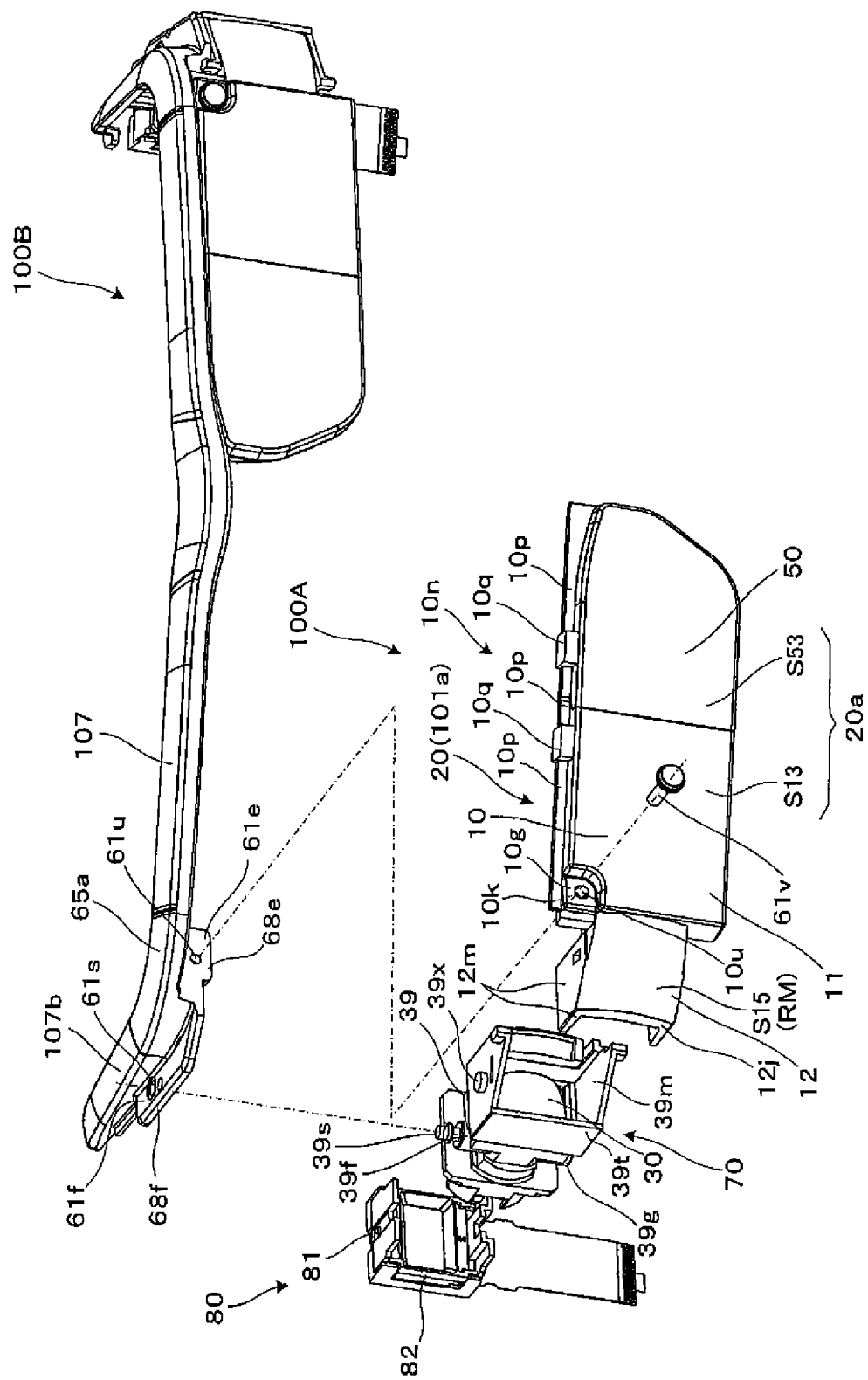
FIG. 7 is an exploded perspective view showing a state where a light guiding device and a projector lens in the virtual image display apparatus are fixed to a frame.

Hereinafter, a description will be given of assembly of the first display device 100A with the frame 107 with reference to FIG. 7. The projector lens 30 which configures the first image formation main body portion 105a is directly fixed to a first fixation portion 61f provided at a side end portion 65a of the frame 107 by using an attachment portion 39g formed so as to be embedded in the lens tube portion 39 accommodating the projector lens 30. By such fixation, it is possible to attach the alignment by causing a rear surface 68f of the first fixation portion 61f to abut an upper end surface 39f and the like of the attachment portion 39g and to implement detachable and reliable fixation by screwing a screw 39s into a hole 61s. At this time, a screw 39x provided in the lens tube portion 39 is fitted into a screw hole (not shown) in the frame 107, rotation of the lens tube portion 39 is restricted, and positioning with respect to the rotation is performed. In contrast, the light guiding device 20 as the first optical member 101a is directly fixed to a second fixation portion 61e provided in a side end portion 65a of the frame 107 by using an attachment portion 10g formed at the neck portion thereof. By such fixation, it is possible to achieve alignment by causing an abutting surface 68e provided at a front portion of the second fixation portion 61e to abut a rear surface 10k of the attachment portion 10g, and to implement detachable and reliable fixation by screwing a screw 61v into a screw hole 10u via a screw hole 61u.

The light guiding device 20 is locked in a state of being positioned with respect to the projector lens 30 by causing a tip end portion 12j of the light guiding member 10 on the side of the second light guiding portion 12 to abut an end portion 39t as a locking member with a rectangular frame shape, which is provided on the front end side of the lens tube portion 39 accommodating the projector lens 30 and opens. That is, when the light guiding member 10 provided in the light guiding device 20 is fixed to the second fixation portion 61e in the frame 107, the tip end portion 12j on the side of the second light guiding portion 12 is inserted so as to be fitted into the end portion 39t of the lens tube portion 39. At this time, a side surface 12m of the tip end portion 12j abuts an inner surface 39m of the end portion 39t, and the alignment is achieved. The lens tube portion 39 includes the fitting structure as described above on the side of the end portion 39t and thus functions as the coupling member which couples the projector lens 30 and the light guiding device 20. Particularly, the fitting enables a sufficient dust proofing effect at portions other than the partially covered optical surface CS, which is the fourth surface S14, between the projector lens 30 and the light guiding device 20. That is, if dust proofing is sufficiently achieved by the sealing member SP in the dust proofing structure DS in the periphery of the partially covered optical surface CS (fourth surface S14) as described above with reference to FIGS. 5 and 6, it is possible to achieve dust proofing or water proofing for the entire optical system in the apparatus. In addition, it is also possible to achieve dust proofing between the first exposed surface 29a of the light guiding device 20 and the external accessory member 105d, for example. However, in the case of the aforementioned configuration, it is considered that the problem is not serious compared to that of the partially covered optical surface CS even if a small amount of dust or the like enters therebetween since the fifth surface S15 on the further inner side is protected by the external accessory member 105d, and the boundary with the first exposed surface 20a is configured of the light reflective film RM. Therefore, it is more important to appropriately achieve dust proofing in the periphery of the partially covered optical surface CS (fourth surface S14).

As described above, the virtual image display apparatus 100 according to the embodiment has a see-through-type configuration, and in relation to the fourth surface S14 as the partially covered optical surface CS from among the plurality of optical surfaces, such as the first surface S11, which configure the light guiding member 10 of the light guiding device 20, the intermediate image is formed at a location which is separated from the partially covered optical surface CS (fourth surface S14). With such a configuration, if dirt, contamination, or the like occurs on the partially covered optical surface CS (fourth surface S14) at a location, from which it is difficult or impossible to remove the dirt, the contamination, or the like, it is possible to reduce the influence of the dirt, the contamination, or the like on the image and to display an image with a wide image angle by the configuration forming the intermediate image. Furthermore, by providing the sealing member SP in the dust proofing structure between the partially covered optical surface CS and the end portion 39t of the lens tube portion 39 as the coupling member, it is possible to prevent dirt or contamination from entering therebetween and to prevent degradation of the image. The performance can be maintained with the see-through-type configuration.

Other Configurations

Although the invention was described above based on the respective embodiments, the invention is not limited to the aforementioned embodiments and can be implemented in various states without departing from the gist of the invention. For example, the following modifications can be made.

Although the fourth surface S14 from among the optical surfaces which contribute to the light guiding is the partially covered optical surface CS which is arranged from the first region D1 covered with the end portion 39t of the lens tube portion 39 as the coupling member to the second region D2, the invention is not limited thereto, and another configuration in which another optical surface is the partially covered optical surface CS is also applicable.

Although the dust proofing structure Ds is the elastic member in the above description, the invention is not limited thereto, and various configurations which secure the dust proofing function, such as a shaped-fabric member or a shaped-brush member, are applicable.

Although the projector lens has one non-axisymmetric aspheric surface in the above description, the projector lens can have two or more non-axisymmetric aspheric surfaces.

Although the half mirror layer (semi-transmitting reflective film) 15 is formed in a horizontally elongated rectangular region in the above description, the outline of the half mirror layer 15 can be appropriately modified in accordance with the purpose thereof and other specifications. In addition, the transmittance and the reflection rate of the half mirror layer 15 can be changed in accordance with the purpose thereof and other specifications.

Although distribution of display luminance in the video image display element 82 is not particularly adjusted in the above description, it is possible to irregularly adjust the distribution of the display luminance in a case where a difference occurs in luminance depending on a position.

Although the video image display element 82 configured of a transmissive liquid crystal display device or the like is used as the image display device 80 in the above description, the image display device 80 is not limited to the video image display element 82 configured of the transmissive liquid crystal display device or the like, and various kinds of image display devices can be used. For example, a configuration of using a reflective liquid crystal display device is also applicable, and it is also possible to use a digital micro mirror device or the like instead of the video image display element 82 configured of the liquid crystal display device or the like. In addition, it is also possible to use a self-emitting element, representative examples of which include an LED array and an organic EL (OLED), as the image display device 80.

Although the image display device 80 configured of the transmissive liquid crystal display device or the like is used in the above embodiment, it is also possible to use a scanning-type image display device instead of the transmissive liquid crystal display device.

In addition, although the above embodiment employs the configuration in which the light guiding member 10 and the light transmitting member 50 as the assistant optical block cover the entirety of the front side of the eyes EY of the wearer thereof, the invention is not limited thereto. A configuration in which a part including the second surface S12 with the spherical surface including the half mirror layer 15 covers a part of the eyes EY, namely a small-sized configuration in which a part of the front side of the eyes is covered and an uncovered is also present and is also applicable.

Although the above description is about the virtual image display apparatus provided with the pair of display devices 100A and 100B, the virtual image display apparatus 100 can be implemented as a single display device. That is, a configuration in which an image is viewed by one eye by providing the perspective projection device 70 and the image display device 80 only for one of the right eye or the left eye instead of providing a pair of the perspective projection devices 70 and the image display device 80 for each of the right eye and the left eye.

Although the half mirror layer 15 is a simple semi-transmitting film (for example, a metal reflective film or a dielectric body multilayered film) in the above description, the half mirror layer 15 can be replaced with a planar or spherical hologram element.

Although the light guiding member 10 and the like extend in the traverse direction in which the eyes EY are aligned in the above description, the light guiding member 10 can be arranged so as to extend in a longitudinal direction. In such a case, the light guiding member 10 has a structure of being arranged in parallel not in series.

Figure 8:
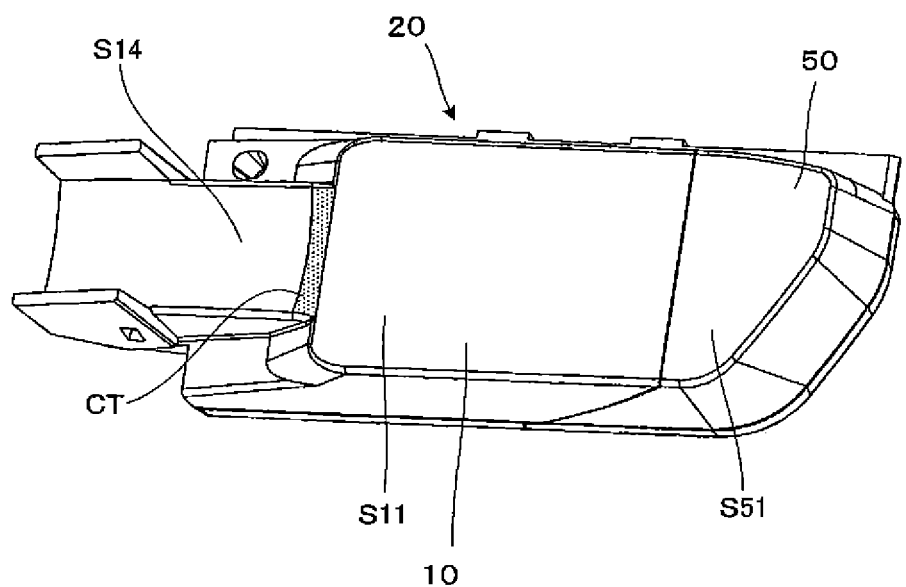
FIG. 8 is a perspective view showing an example of a surface-textured light guiding device.
Figure 9:
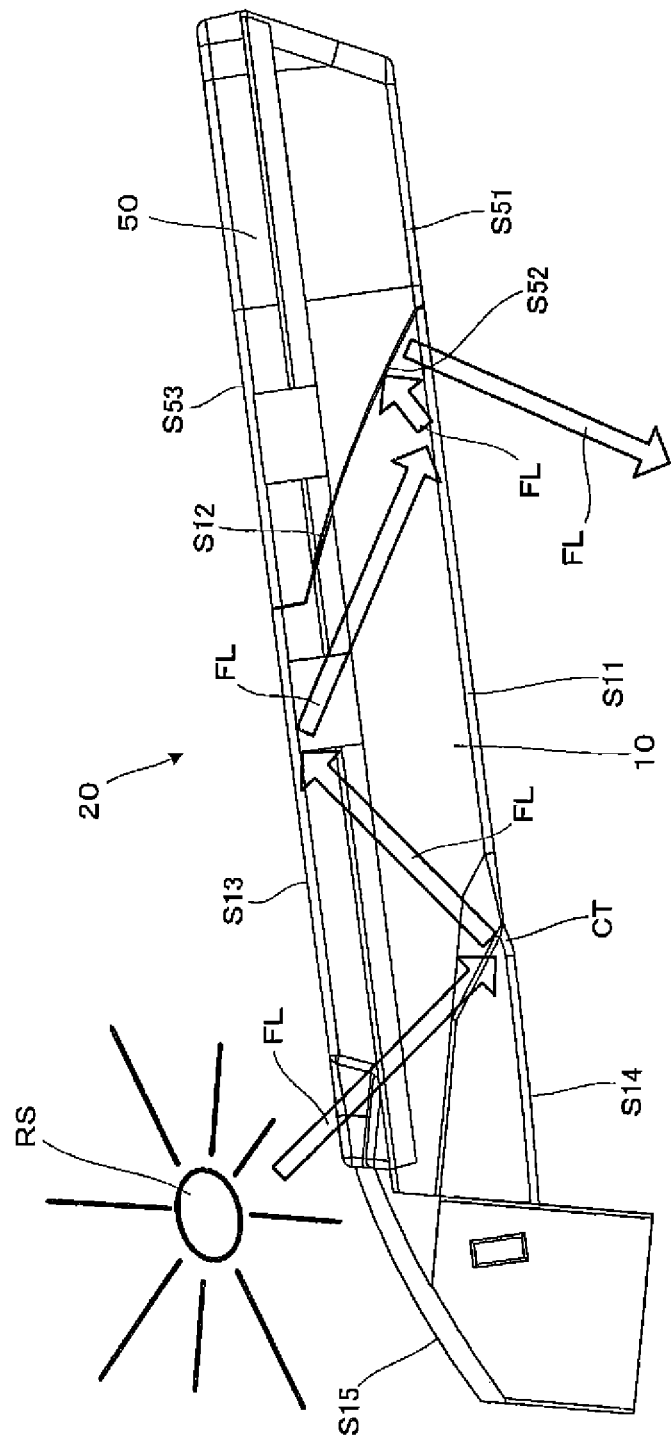
FIG. 9 is a diagram showing an example of an optical path of leaking light.

In addition, a textured surface may be included in order to reduce an influence of leaking light from the outside. Specifically, it is possible to perform surface texturing on the surface of the connecting portion CT at a location where the first surface S11 and the fourth surface S14 as the optical surfaces are coupled, in the light guiding device 20 as shown in FIG. 8. In a case where external light from a light source RS such as a fluorescent light enters as unintended leaking light FL to the light guiding device 20 as shown in FIG. 9, for example, there is a possibility in that the leaking light FL is reflected by a surface (that is, in a non-effective light guiding region) other than the optical surfaces, such as the connecting portion CT, is reflected by the respective optical surfaces such as the third surface S13, and is visually recognized by the viewer. In a case of securing the see-through property, there is a condition under which such entering of light from the outside is inevitable to some extent. In contrast, it is possible to satisfactorily maintain the guiding of the video image light and reduce the influence of the leaking light FL by appropriately provide the textured surface, as necessary, at a location at which the textured surface does not contribute to the guiding of the video image light, such as the connecting portion CT, in consideration of an influence on the see-through property as shown in FIG. 8. According to the above embodiment, the dust proofing structure DS is provided in the effective light guiding region in an optical surface, namely the fourth surface S14*b* which is optically effective from among the surfaces of the light guiding device 20. In contrast, surface texturing is performed on the surface (that is, in the non-effective light guiding region) of the connecting portion CT as a surface other than the optically effective surfaces. By the addition and the working performed on the optical surfaces which configure the surfaces of the light guiding device 20 or on the surfaces other than the optical surfaces as described above, it is possible to satisfactorily guide the video image light.

The entire disclosure of Japanese Patent Application No. 2013-266618, filed Dec. 25, 2013 is expressly incorporated by reference herein.

What is claimed is:

1. A virtual image display apparatus comprising:
    a video image element which forms video image light;
    a light guiding member which has a plurality of optical surfaces, guides video image light from the video image element by reflecting the video image light by an internal surface, and forms an intermediate image; and
    a coupling member which is arranged between the video image element and the light guiding member, is coupled to the light guiding member, and partially covers the light guiding member,
    wherein the light guiding member includes, in the plurality of optical surfaces, a partially covered optical surface from a first region which is covered with the coupling member to a second region which is not covered with the coupling member, and the intermediate image is formed at a location separated from the partially covered optical surface.

2. The virtual image display apparatus according to claim 1,
    wherein in the light guiding member, the intermediate image is formed in a range from a side separating inward from the partially covered optical surface to a side of a surface which faces the partially covered optical surface.

3. The virtual image display apparatus according to claim 1, further comprising:
    a dust proofing structure formed at least between the partially covered optical surface and an end portion of the coupling member between the light guiding member and the coupling member.

4. The virtual image display apparatus according to claim 3,
    wherein the dust proofing structure is formed so as to be in contact with an effective light guiding region in the partially covered optical surface and includes a sealing member which seals the partially covered optical surface and the coupling member together.

5. The virtual image display apparatus according to claim 4,
    wherein the sealing member extends along a boundary between the first region and the second region and is in contact with the effective light guiding region on the partially covered optical surface in a light guiding direction, in which the video image light is guided, with a width of equal to or less than 0.5 mm.

6. The virtual image display apparatus according to claim 3,
wherein the dust proofing structure is an elastic member.

7. The virtual image display apparatus according to claim 1,
wherein the light guiding member has a surface-textured portion on a surface other than the effective light guiding region.

8. The virtual image display apparatus according to claim 1,
wherein the coupling member is a lens tube portion which accommodates a projector lens projecting light from the video image element toward the light guiding member.

9. The virtual image display apparatus according to claim 8,
wherein the lens tube portion has a fitting structure which is fitted onto the light guiding member.

10. The virtual image display apparatus according to claim 1,
wherein the partially covered optical surface is a non-axisymmetric spherical surface.

11. The virtual image display apparatus according to claim 1,
wherein the light guiding member includes four or more surfaces as the plurality of optical surfaces such that a first surface and a third surface from among the plurality of optical surfaces are arranged to face each other,
wherein the video image light from the video image element is fully reflected by the third surface, is fully reflected by the first surface, is reflected by the second surface, then transmits through the first surface, and reaches a viewing side,
wherein the first surface and the third surface of the light guiding member are substantially parallel planes, and
wherein the partially covered optical surface is arranged to face the third surface and corresponds to a fourth surface which fully reflects the video image light from the video image element and guides the reflected video image light to the third surface.

12. The virtual image display apparatus according to claim 11,
wherein the intermediate image is formed on a side which is closer to the third surface than to the fourth surface in the light guiding member.

13. The virtual image display apparatus according to claim 1, further comprising:
a light transmitting member which is attached to the light guiding member such that external light and the video image light are visually recognized in an overlapped manner.

* * * * *